Aug. 22, 1933.  R. S. CROSBY ET AL  1,923,423
MACHINE FOR CUTTING SCREW THREADS
Filed April 9, 1930
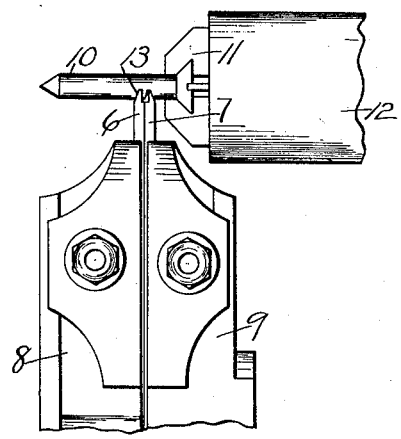
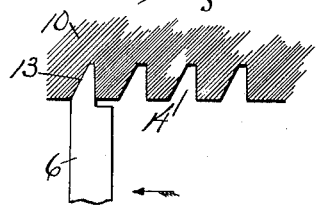 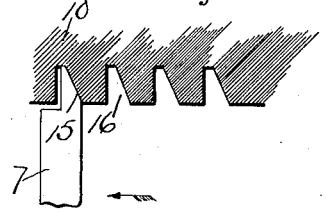 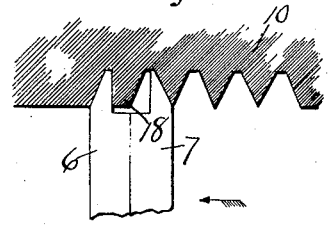
INVENTOR.
Ruben S. Crosby,
Frank E. Newton,
by
Arthur  Jenkins,
ATTORNEY.

Patented Aug. 22, 1933

1,923,423

UNITED STATES PATENT OFFICE 1,923,423

MACHINE FOR CUTTING SCREW THREADS

Reuben S. Crosby and Frank E. Newton, Hartford, Conn., assignors to The Asa S. Cook Company, Hartford, Conn., a Corporation of Connecticut Application April 9, 1930. Serial No. 442,820

2 Claims. (Cl. 10—101)

Our invention relates more especially to the formation of threads on so-called "wood screws", that is, screws intended for insertion in wood or similar materials, and an object of our invention, among others, is the production of means for rapidly cutting a thread true as to shape and formed to produce maximum results in use.

Our invention, in one of its forms, and in the practice, making and use of which the objects herein mentioned, as well as others, may be attained is illustrated in the accompanying drawing, in which—

Figure 1 is a diagrammatic view illustrating the relative positions of a screw blank and cutting tools in the practice of our invention.

Figure 2 is a detail view, scale enlarged, showing the edge of a cutting tool and a section of a screw blank lengthwise of the latter showing the shape of the groove formed by one of our improved cutting tools.

Figure 3 is a similar view showing the shape of a groove cut by another of our improved cutting tools.

Figure 4 is another similar view illustrating the shape of the thread produced by the operation of two of our improved cutting tools.

It has heretofore been common practice in the cutting of threads to produce so-called "wood screws" to repeatedly pass one or more tools along the blank lengthwise thereof, each tool cutting the groove that produces the thread across its whole width. It is a well known fact that the depth to which a tool or tools can cut to produce a satisfactory thread and at a single operation is limited by reason of various conditions pertaining to the blank holding means, the cutting tool, the back rest for the blank and the strength of the material composing the blank. Therefore, it is required that the tool or tools shall be passed along the blank a number of times to effect the proper cutting of a satisfactory thread.

By the practice of our invention we have demonstrated that a groove to produce a thread on a blank may be cut deeper at a single operation of tools than has heretofore been possible with material and tools in common use and further, that a thread may be more rapidly produced on a blank composed of material which it has heretofore been a difficult matter to satisfactorily thread.

Our invention comprises the act of cutting only a portion of the groove widthwise thereof by one tool or element and then completing the width of the groove by the action of another tool or element.

In the preferred manner of practicing our invention we employ at least two tools 6 and 7. These tools may be supported in any suitable manner, as by posts 8 and 9 of any common separately mounted and operated and well known construction and which may be actuated in any well known manner to traverse the tools lengthwise of the blank 10 that may be held by chuck jaws 11 mounted in a spindle 12. The chuck and spindle may be of any well known construction and the latter may be rotated in any desirable manner, and any suitable means may be employed for operating the tool posts to move the tools into contact with the blank and to withdraw them therefrom. Preferably the tools are so relatively positioned as to work in different portions of the groove forming the screw thread and substantially along the same line extending lengthwise of the blank.

One of the tools, as the tool 6, is beveled on one side, as at 13, this beveled portion comprising the cutting point of the tool. If this tool alone were passed along the blank a sufficient number of times, a groove 14 of the shape shown in Figure 2 would be produced.

Another tool, as the tool 7, is beveled, as at 15, this beveled portion extending in the opposite direction relatively to the bevel 13 on the tool 6. If the tool 15 be passed a number of times along the blank a groove 16 of the shape shown in Figure 3 would be produced. It will be noted here that the groove 16 is formed by removing the metal on the opposite side of the groove from that at which the metal was removed by the tool 6.

In the operation of cutting the threads, however, both tools are caused to operate simultaneously, and as shown in Figure 4, and they are preferably so relatively located as to operate in adjoining spaces between two portions of the thread. The tool 6 passing along the groove in the direction indicated by the arrow cuts substantially one-half of the groove widthwise thereof, leaving a portion 18 uncut, and the tool 7, following immediately behind the tool 6 in the adjacent space, removes this uncut portion and completes the groove so far as its width is concerned.

In actual operations of cutting the threads it is preferred that one of the tools shall cut a little more than half of the thread widthwise of the groove, the leading tool, as the tool 6, effectively doing this. This causes a little more than half of the bottom of the groove to be cut by one tool, and the second tool, as the tool 7, will be of a width, as to its cutting edge, to slightly overlap the part cut away by the first tool in the bottom of the groove, thereby avoiding the creation of a rib therein.

We have demonstrated by repeated experiment that two tools each operating to cut a portion of the groove widthwise thereof may be made to cut deeper and produce a satisfactory thread at each pass of the tools than will a single tool at two passes thereof and cutting the full width of the groove, or two tools at a single pass each cutting the full width of the groove. In short, at least one less number of passes of the tools lengthwise along the blank will be required of our improved tools than will be required by two tools each cutting the full width of the groove, this to produce a screw of a certain size in each case.

We have not only demonstrated that a deeper cut may be made in a single pass of the tools by the practice of our invention, but that threads my be cut upon blanks composed of metal, as stainless steel, which it has been heretofore impossible to satisfactorily thread by the use of old methods.

We claim:

1. A screw thread cutting machine including rotatably mounted means for holding a blank, and a pair of cutting tools each separately mounted and operated and having thread cutting ends located substantially in line lengthwise of said blank in adjacent portions of the thread groove, one of said tools being formed to remove the metal on one side of the said groove and the other of said tools being formed and operating simultaneously with the first tool to remove the metal left by said first tool on the opposite side of the thread groove to complete the groove widthwise thereof.

2. A screw thread cutting machine including rotatably mounted means for holding a blank, a set of cutting tools each separately mounted and operated for threading said blank, one of said tools being shaped to simultaneously cut the part of a thread groove next and opposite to that which is cut by another of said tools, and the tool to first operate being of a width to cut more than half the groove widthwise thereof.

REUBEN S. CROSBY.
FRANK E. NEWTON.